United States Patent
George et al.

(10) Patent No.: US 12,450,724 B2
(45) Date of Patent: Oct. 21, 2025

(54) STRUCTURAL CHARACTERISTIC PREDICTION FOR A HONEYCOMB BODY USING IMAGE ABSTRACTION

(71) Applicant: CORNING INCORPORATED, Corning, NY (US)

(72) Inventors: Jacob George, Horseheads, NY (US); Byoungseon Jeon, Malden, MA (US); Seth Thomas Nickerson, Corning, NY (US); Hak Chuah Sim, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 370 days.

(21) Appl. No.: 18/020,826

(22) PCT Filed: Aug. 5, 2021

(86) PCT No.: PCT/US2021/044594
§ 371 (c)(1),
(2) Date: Feb. 10, 2023

(87) PCT Pub. No.: WO2022/035664
PCT Pub. Date: Feb. 17, 2022

(65) Prior Publication Data
US 2023/0334651 A1 Oct. 19, 2023

Related U.S. Application Data

(60) Provisional application No. 63/065,113, filed on Aug. 13, 2020.

(51) Int. Cl.
*G06T 7/00* (2017.01)
(52) U.S. Cl.
CPC .... *G06T 7/001* (2013.01); *G06T 2207/20084* (2013.01); *G06T 2207/30108* (2013.01)

(58) Field of Classification Search
CPC ........... G06T 7/001; G06T 2207/20084; G06T 2207/30108; G06T 2207/20081; G06T 7/0004
See application file for complete search history.

(56) References Cited

U.S. PATENT DOCUMENTS

| 8,285,027 B2 | 10/2012 | Zoeller, III |
| 8,470,255 B2 | 6/2013 | Mizutani et al. |

(Continued)

FOREIGN PATENT DOCUMENTS

| EP | 3486867 A1 | 5/2019 |
| WO | 2016/085781 A1 | 6/2016 |

(Continued)

OTHER PUBLICATIONS

Abadi et al; "Tensorflow: Large-Scale Machine Learning on Heterogeneous Distributed Systems"; arXiv:1603.04467 ; 2015, 19 Pages.

(Continued)

*Primary Examiner* — Juan M Guillermety
(74) *Attorney, Agent, or Firm* — Kevin M. Able

(57) ABSTRACT

A method and system for inspecting a honeycomb body. The method includes capturing a first image. Instances of at least one feature in the first image that correlates to a structural characteristic of the honeycomb body are detected. One or more detected instances of the at least one feature identified in the first image are abstracted by creating a graphical representation of each of the one or more detected instances of the at least one feature. A second image is generated by augmenting the first image with the graphical representation in place of or in addition to each of the one or more detected instances of the at least one feature identified in the first image. The second image is analyzed using a machine learning algorithm to classify the honeycomb body with (Continued)

respect to the structural characteristic of the honeycomb body.

20 Claims, 10 Drawing Sheets

(56) References Cited

U.S. PATENT DOCUMENTS

| | | | |
|---|---|---|---|
| 9,466,013 | B2 | 10/2016 | Sawhney et al. |
| 9,996,766 | B2 | 6/2018 | Richard et al. |
| 10,043,097 | B2 | 8/2018 | Yagev et al. |
| 2013/0212051 | A1 | 8/2013 | Stephens et al. |
| 2014/0122391 | A1 | 5/2014 | Mugan et al. |
| 2016/0267326 | A1 | 9/2016 | Yagev et al. |
| 2019/0026414 | A1* | 1/2019 | Nickerson ............. G06T 7/0004 |
| 2021/0279849 | A1* | 9/2021 | Nakamura ............. G06T 7/001 |
| 2021/0291458 | A1* | 9/2021 | Edelen, III ............ G06T 7/0004 |

FOREIGN PATENT DOCUMENTS

| | | |
|---|---|---|
| WO | 2016/187180 A1 | 11/2016 |
| WO | 2017/123919 A1 | 7/2017 |

OTHER PUBLICATIONS

Cheng et al; "Vision-Based Online Process Control in Manufacturing Applications"; IEEE Transaction on Automation Science and Engineering, vol. 5, No. 1 (2008), pp. 140-153.

Chollet et al; "Simple. Flexible. Powerful." , Retrieved from: https://keras.io;, 2015, 4 pages.

He et al; "Deep Residual Learning for Image Recognition"; arXiv:1512.03385 ; 2015, 12 Pages.

Lee et al; "An Online Tool Temperature Monitoring Methed Based on Physics-Guided Infrared Image Features and Artifical Neural Network for Dry Cutting"; IEEE Transactions on Automation Science and Engineering, vol. 15, No. 4 (2018), pp. 1665-1676.

Ng et al; "Recognition of Partially Occluded Objects With Back-Propagation Neural Network"; International Journal of Pattern Recognition and Atrifical Intelligence, vol. 12, No. 5 (1998), pp. 645-660.

Wiskott et al; "A Neural System for the Recognition of Partially Occluded Objects in Cluttered Scenes, A Pilot Study"; Int. J. of Pattern Recognition and Artificial Intelligence, 7 (4); (1993), pp. 935-948.

International Search Report and Written Opinion of the International Searching Authority; PCT/US2021/044594; dated Nov. 18, 2021; 12 pages; European Patent Office.

Langer S A et al: "OOF: an image-based finite-element analysis of material microstructures" , Computing in Science and Engineering, vol. 3, No. 3, May 1, 2001 (May 1, 2001), pp. 15-23.

* cited by examiner

STRUCTURAL CHARACTERISTIC PREDICTION FOR A HONEYCOMB BODY USING IMAGE ABSTRACTION

CROSS REFERENCE TO RELATED APPLICATION

This is a national stage application under 35 U.S.C. § 371 of International Application No. PCT/US2021/044594, filed on Aug. 5, 2021, which claims the benefit of priority under 35 U.S.C. § 119 of U.S. Provisional Application Ser. No. 63/065,113 filed on Aug. 13, 2020, the content of which is relied upon and incorporated herein by reference in their entireties.

FIELD OF THE INVENTION

The present specification relates to honeycomb bodies and more particularly to methods of predicting the strength of honeycomb bodies using image abstraction.

BACKGROUND

Honeycomb bodies are used in a variety of applications, such as in particulate filters and catalytic converters used in engine exhaust treatment.

SUMMARY

Various approaches are described herein for, among other things, predicting a structural characteristic (e.g., property, parameter, or attribute) of a honeycomb body, such as isostatic strength, using image abstraction. For instance, a method of predicting a structural characteristic of a honeycomb body can be configured to improve the analysis of a honeycomb body using machine learning by utilizing image abstraction.

In one aspect, a method of inspecting a honeycomb body is provided. The method comprises capturing a first image; detecting instances of at least one feature in the first image that correlates to a structural characteristic of the honeycomb body; abstracting one or more detected instances of the at least one feature identified in the first image by creating a graphical representation of each of the one or more detected instances of the at least one feature; generating a second image by augmenting the first image with the graphical representation in place of or in addition to each of the one or more detected instances of the at least one feature identified in the first image; and analyzing the second image using a machine learning algorithm to classify the honeycomb body with respect to the structural characteristic of the honeycomb body.

In some embodiments, generating the second image further comprises reducing a resolution of the first image such that a first resolution of the first image is greater than a second resolution of the second image.

In some embodiments, the at least one feature relates to at least one of an estimated stress, a web thickness, a broken cell wall, an angled cell wall, or a bent cell wall.

In some embodiments, abstracting the first image comprises characterizing each of the one or more detected instances of the at least one feature identified in the first image by at least one of a feature type of each of the one or more detected instances, a magnitude quantifying each of the one or more detected instances, and a location on the honeycomb body of each of the one or more detected instances. In some embodiments, the graphical representation comprises a color, a shape, a size, an orientation, a pattern, or a combination thereof, corresponding to at least one of the feature type, the magnitude, or the location on the honeycomb body.

In some embodiments, detecting each of the one or more detected instances of at least one feature in the first image that correlates to a structural characteristic of the honeycomb body comprises collecting measurement data of the honeycomb body via machine vision software.

In some embodiments, the first image has a resolution of at least about 10 megapixels and each of the one or more detected instances of the at least one feature has a size of at most about 1000 pixels. In some embodiments, each of the one or more detected instances of the at least one feature has a size of at most about 0.001% of a resolution of the first image.

In some embodiments, the machine learning algorithm comprises a deep neural network. In some embodiments, the deep neural network is a convolutional neural network.

In some embodiments, the structural characteristic comprises an isostatic strength of the honeycomb body. In some embodiments, the structural characteristic comprises an accuracy with respect to a target shape of the honeycomb body.

In some embodiments, the method further comprises determining whether the honeycomb body has passed or failed inspection by comparing the predicted value to a target threshold value. In some embodiments, the method further comprises displaying a result of the determining. In some embodiments, the method further comprises moving the honeycomb body to a first area if the determining results in a pass and to a second area if the determining results in a fail.

In another aspect, an imaging system for inspecting a honeycomb body is provided. The imaging system comprises a camera configured to capture a first image of an end face of the honeycomb body; a controller in signal communication with the camera comprising a machine learning algorithm, the controller configured to: receive the first image from the camera; detect instances of at least one feature of the honeycomb body in the first image that correlates to a structural characteristic of the honeycomb body; abstract the first image by creating a graphical representation of one or more detected instances of the at least one feature; generate a second image comprising the graphical representation in place of or in addition to the one or more detected instances of at least one feature; and analyze the second image using a machine learning algorithm to classify the honeycomb body with respect to the structural characteristic of the honeycomb body.

In some embodiments, the structural characteristic comprises an isostatic strength of the honeycomb body. In some embodiments, the structural characteristic comprises an accuracy with respect to a target shape of the honeycomb body.

In some embodiments, the first image has a first resolution and the second image has a second resolution that is lower than the first resolution.

In some embodiments, the controller is configured to create the graphical representation by characterizing the feature by at least one of a feature type of each of the one or more detected instances, a magnitude quantifying each of the one or more detected instances, or a location of each of the one or more detected instances on the honeycomb body. In some embodiments, the graphical representation comprises a color, a shape, a size, an orientation, a pattern, or a combination thereof, corresponding to at least one of the feature type, the magnitude, or the location on the honeycomb body.

In some embodiments, the controller is further configured to determine whether the honeycomb body has passed or failed inspection by comparing the predicted value to a target threshold value. In some embodiments, the controller comprises a display and is further configured to display whether or not the honeycomb body is determined to have passed or failed inspection.

In some embodiments, the first image has a resolution of at least about 10 megapixels and each of the one or more detected instances of the at least one feature has a size of at most about 1000 pixels. In some embodiments, each of the one or more detected instances of the at least one feature has a size of at most about 0.001% of a resolution of the first image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
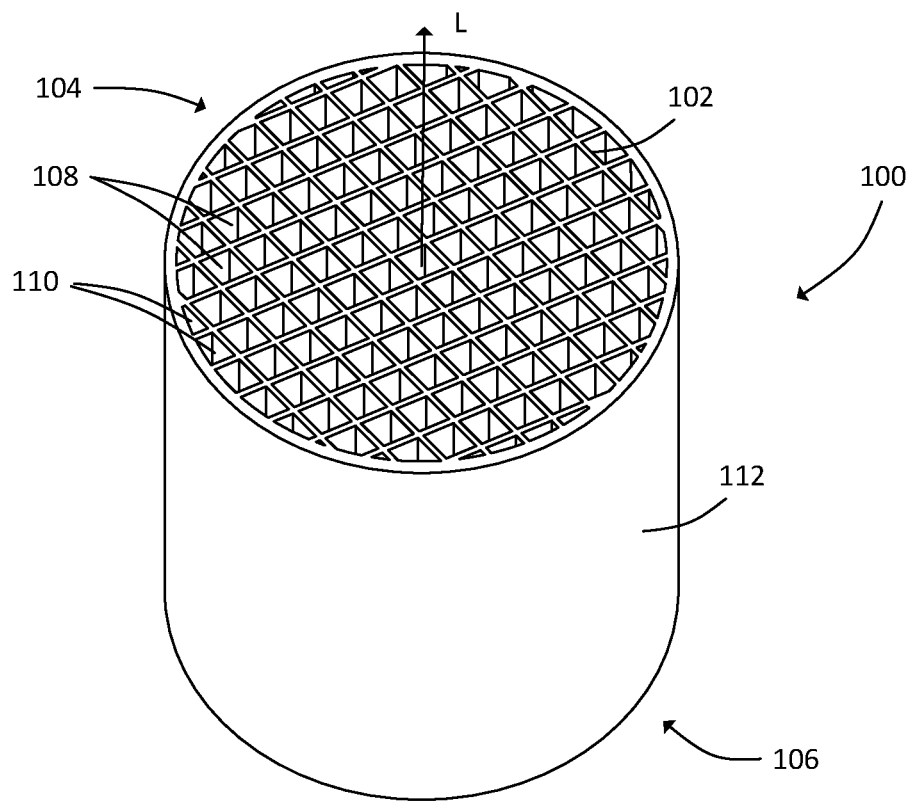
FIG. 1 is a perspective view of a honeycomb body according to one embodiment disclosed herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings that illustrate embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example," or the like, indicate that the embodiment described may include a particular feature, structure or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Embodiments described herein provide improvements in inspecting and analyzing honeycomb bodies. Embodiments of disclosed methods enable prediction of the structural characteristics of a honeycomb body (workpiece) from a face scan image of the honeycomb body. For example, a machine learning algorithm (which collectively refers to any combination of one or more algorithms, models, and/or data implemented by hardware and/or software components) can be used to classify the images into those corresponding to honeycomb bodies predicted to "pass" or "fail" inspection with respect to the structural characteristic, but without the need to perform a potentially destructive inspection test. For example, the classification can be based on instances of geometric features identified in a high-resolution image of the face of the honeycomb body. Embodiments of the method comprise collecting a first image, abstracting features (e.g., geometric imperfections) of the first image to generate a second image, and classifying the honeycomb body with respect to a structural characteristic based at least in part on the second image using a machine learning algorithm. The machine learning algorithm can be a collection of any number of algorithms, and can be supervised or unsupervised.

The systems and methods disclosed herein are especially beneficial for predicting structural characteristic that would otherwise require measurement through physical and/or destructive testing. For example, some testing methods may include applying a compressive load on the outside of a honeycomb body. Advantageously, the currently disclosed systems and methods provide a non-destructive and non-contact means of testing structural characteristics.

Additionally, the systems and methods disclosed herein can be utilized to analyze not only fired ware (the final ceramic honeycomb bodies), but also green ware (unfired honeycomb bodies). For example, the application of compressive forces and other potentially destructive testing methods are not applicable to green ware, as these test methods need to be carried out on the final ceramic material, which inherently has not been formed yet when in the green state. Additionally, the ability to test green ware avoids spending additional time and cost firing and handling honeycomb bodies that are determined by the disclosed methods as not likely to meet structural requirements, e.g., isostatic strength or a target shape or target dimensions. For example, the shape (and/or dimensional accuracy) of the final ceramic honeycomb body can be of importance in many applications, e.g., to facilitate the installation of the honeycomb body in an exhaust system, and the systems and methods disclosed herein can be useful in identifying geometric features in the green state that ultimately affect or are correlated to accurately achieving the target shape of the final ceramic honeycomb body as the green ware is subject to subsequent manufacturing processes.

Analysis of the end face of a honeycomb body is particularly challenging as the face of a honeycomb body may comprise a repeating array of hundreds or even thousands of cells defined by walls having particularly small thicknesses with respect to the diameter of the honeycomb body, each of which cell must be individually analyzed. As a result, the geometric features (e.g., imperfections) are extremely small relative to the total size of the end face and/or the total resolution of an image of the end face. The systems and methods disclosed herein also enable the use of machine learning algorithms to timely and accurately detect and analyze features that are extremely small in high resolution images (e.g., features that are at most a few hundred pixels in a 10 megapixel or higher resolution image, and/or features that occupy less than about 0.01%, 0.001%, or even less than about 0.0005% of an image). Machine learning algorithms are generally not well equipped to analyze images for such small features, but the methods and systems disclosed herein facilitate the use of such machine learning algorithms by significantly reducing the time and computational resources required to accurately complete the analysis.

Machine learning algorithms useful to the embodiments disclosed herein can be based on a predictive model built using empirical data, such as that gathered by destructive testing of parts (e.g., isostatic pressure testing, flexure testing, crush testing and shear testing), so that performance attributes of subsequent workpieces can be predicted. The machine learning algorithm can be updated over time by performing tests on analyzed honeycomb bodies to see whether the algorithm correctly or incorrectly predicted the performance. As an example, the performance attribute can be isostatic strength and the selected features can include geometric imperfections in the honeycomb body that correlate to variability in the isostatic strength. As an example, isostatic strength can be analyzed to determine whether a honeycomb body is sufficiently strong to withstand a subsequent "canning" process in which the honeycomb body is "canned", or secured in a housing or container, ultimately for installation in a vehicle exhaust system.

The embodiments disclosed herein provide for direct quantitative analysis to replace or supplement qualitative decisions by an operator. The methods described herein provide flexibility in analysis so that a honeycomb body having seemingly random or arbitrary combinations of features (e.g., geometric imperfections), can be efficiently analyzed. Additionally, the methods may be used to analyze different channel designs, e.g., channels of different sizes, shapes, cells per square inch (cpsi), etc. The disclosed methods can utilize high-resolution imaging systems and focuses high-resolution image data to provide input for machine learning that reduces memory and processing burden. The disclosed methods utilize automatic feature detection for identifying instances of features such as geometric imperfections in the honeycomb body and provides an abstracted image that has lower resolution than the captured image. The abstracted image can then be analyzed to predict the performance attribute. As a result, the processing speed can be significantly improved, which can be used to provide faster feedback to operators.

In addition to predicting the structural characteristics of existing honeycomb bodies, the methods disclosed herein can also be used for quality control and/or to assist in product design. For example, providing a method of identifying the root cause of variability enables corrective actions to be implemented to reduce the magnitude of the variability in future manufacturing. As another example, the results of the disclosed methods can be used to identify the degree to which various features (e.g., different geometric imperfections) correlate to the performance of a honeycomb body (e.g., exhibiting sufficient isostatic strength), which can then be used to analyze and/or set the tolerances or target values for those features in manufacture of future honeycomb bodies.

Figure 2:
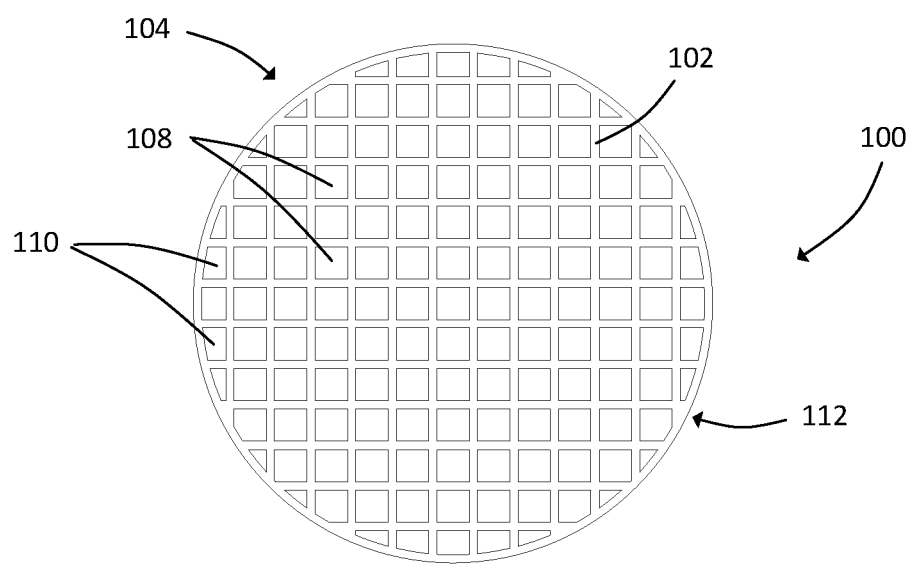
FIG. 2 is an end view of the honeycomb body of FIG. 1.

FIGS. 1 and 2 illustrate an exemplary honeycomb body 100. The honeycomb body 100 can be a green body or a ceramic article. The honeycomb body 100 can be formed in any desired manner, e.g., by extruding a ceramic-forming mixture through an extrusion die to form a green body, and/or drying the green body, cutting the green body to length, and firing the green body to form a ceramic material. Whether green or fired, the honeycomb body 100 comprises a plurality of spaced and intersecting inner walls 102, or webs, extending longitudinally through the honeycomb body 100 from a first end face 104 to a second end face 106. The inner walls 102 combine to define a plurality of channels 108, or cells, extending through the honeycomb body 100 from the first end face 104 to the second end face 106 to form a cellular honeycomb structure of the honeycomb body 100.

The honeycomb body 100 can be constructed from at least one porous material having a predetermined mean pore size selected to block particulates carried in a gas of a working fluid (e.g., combustion exhaust or other fluid having filterable components) that is forced to flow through the pores. The honeycomb body 100 also comprises peripheral channels 110 that are generally partial channels that intersect an outer skin 112 of the honeycomb body 100. As illustrated, the honeycomb body 100 comprises channels 108 having a square cross-sectional shape, but the channels 108 can have other cross-sectional shapes, such as triangular, hexagonal, or combinations of shapes etc. The honeycomb body 100 defines a longitudinal axis L that extends from the second end face 106 to the first end face 104 that is substantially parallel to a longitudinal axis of the channels 108.

Figure 3A:
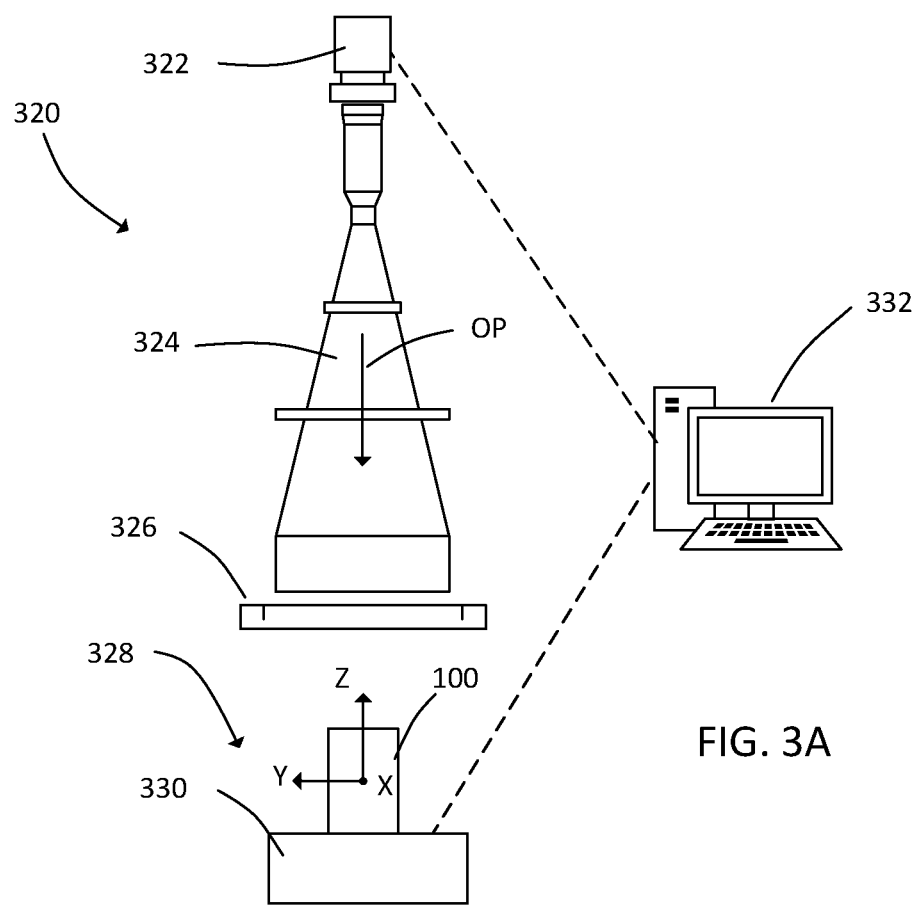
FIG. 3A is a side view of an imaging system that can be used in accordance with an embodiment.

Referring to FIG. 3A, an imaging system 320 that can be used to capture high-resolution images of the honeycomb body 100 will be described. The imaging system 320 can be used to capture images of portions of the honeycomb body 100 that can be analyzed using machine vision software to collect measurement data for features of the honeycomb body 100. In an embodiment, the imaging system 320 is configured to collect images of the honeycomb body 100 having resolution that is at least about 4,000×4,000 pixels. In another embodiment, the imaging system is configured to collect images of the honeycomb body 100 having resolution that is at least about 8,000×8,000 pixels or even at least about 15,000×15,000 pixels. The imaging apparatus 320 comprises a camera 322, a lens 324, a light source 326, a part fixture 328, and a controller 332.

The camera 322 is disposed on a first side of the honeycomb body 100 and is configured to capture high-resolution images of the honeycomb body 100. The camera 322 can be a digital camera that is configured to record digital image data corresponding to the honeycomb body 100 so that measurement data of features of the honeycomb body 100 can be collected. The digital image data is based at least in part on an image of the honeycomb body 100 that passes through the lens 324 and is projected onto a digital image sensor in the camera 322. The camera 322 can be configured to collect monochromatic or multi-color image data. Exemplary digital cameras that can be employed are the Dalsa Falcon 4, 86 MP digital camera; and the Prosilica GT 6600 28.8 MP digital camera. In an embodiment, the camera 322 has a resolution relating to a physical dimension of the honeycomb body 100 that corresponds to approximately 20-50 μm per pixel, in another embodiment 30-40 μm per pixel, and in another embodiment about 36 μm per pixel.

The lens 324 is also disposed on the first side of the honeycomb body 100 and defines an optical axis OP. The lens 324 is optically coupled to the camera 322 so that an image of the honeycomb body 100 is passed through the lens 324 and directed to the camera 322. In the illustrated embodiment, the lens 324 is interposed between the camera 322 and the honeycomb body 100. The lens 324 can be integrally formed as part of the camera 322, detachably coupled to the camera 322, and/or otherwise arranged so as to direct an image to an imaging sensor of the camera 322.

The light source 326 can be disposed on the first side of the honeycomb body 100, i.e., the same side of the honeycomb body 100 as the camera 322 and the lens 324. That location enables the light source 326 to directly illuminate the end face of the honeycomb body 100 closest to the lens 324. The light source 326 can be disposed adjacent the lens 324 and can be coupled to the lens 324. The light source 326 can be a high intensity monochromatic ring light that is generally annular and that circumscribes the optical axis OP (and the field of view) of the lens 324. The light source 326 can be constructed from a plurality of light sources, such as light-emitting diodes (LED) distributed around the optical axis that emit uniform monochromatic light, such as monochromatic green light.

The light source 326 can be configured to provide direct illumination or back lighting. As shown in FIG. 3A, the light source 326 is configured to provide direct illumination. A light source disposed on the side of the honeycomb body 100 opposite the lens 324 can be used to provide back lighting so the imaging system 320 captures the illuminated negative space, i.e., a shadow image, formed by the honeycomb body 100.

The part fixture 328 is configured to hold the honeycomb body 100 in a desired orientation so that at least a portion of the honeycomb body 100 can be imaged. The part fixture 328 comprises a part support 330 that secures the honeycomb body 100 on the part fixture 328. The part fixture 328 can also comprise an XY stage and/or a tilt stage so that the honeycomb body 100 can be moved relative to the camera 322 and lens 324.

The controller 332 can include a processor, memory and/or data storage, and a display. The controller 330 can include software to instruct the camera 322 to capture images and the part fixture 328 to alter the relative positions of the honeycomb body 100 and the imaging system 320. Additionally, the controller 332 can be configured to perform feature measurement by executing image measurement software, and to perform abstraction as described in greater detail below.

In some embodiments, the features captured and measured using the imaging system 320 are geometric imperfections, i.e., geometries included in the honeycomb body 100 that are different than an intended or designed geometry. Geometric imperfections may be created during extrusion of the honeycomb body 100 and cause the performance of the honeycomb body 100 to differ from an intended or designed performance.

In some embodiments, the geometric imperfections identified by the imaging system 320 are utilized to adjust or control one or more operating parameters of the system for manufacturing the honeycomb body, such as the operating parameters of one or more components of an extruder. In this way, the analysis of a presently imaged one of the honeycomb bodies 100 can be utilized to change operation of the an extruder, thereby preventing or reducing similar geometric imperfections from manifesting in subsequently extruded honeycomb bodies.

Figure 3B:
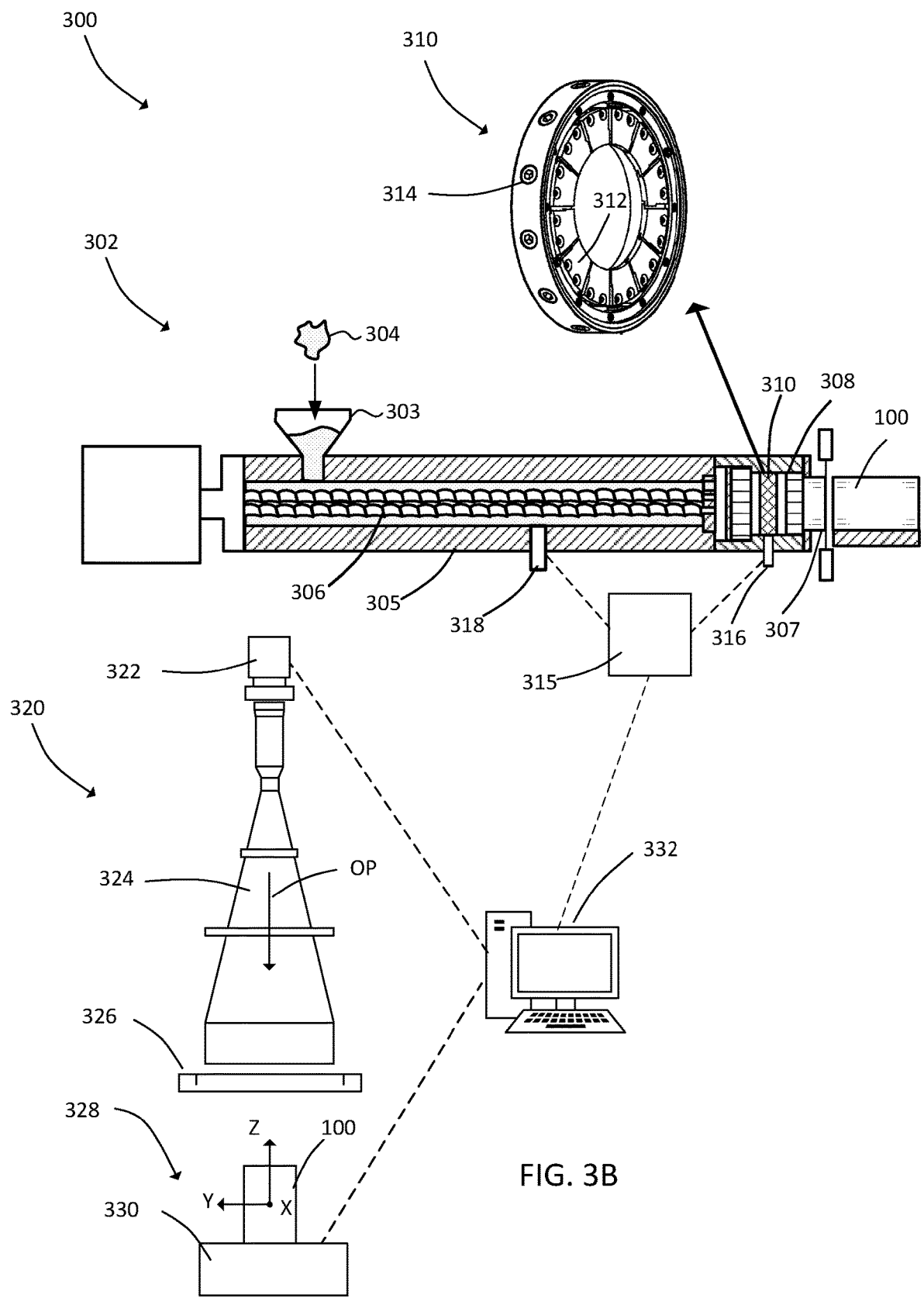
FIG. 3B is a side view of a honeycomb body manufacturing system comprising the imaging system of FIG. 3A in communication with an extruder in accordance with an embodiment.

Accordingly, referring to FIG. 3B, a manufacturing system 300 is shown comprising the imaging system 320 (as described with respect to FIG. 3A) in addition to an extruder 302 for forming the honeycomb body 100. The extruder 302 comprises a hopper or inlet 303 for receiving a ceramic-forming batch mixture 304 of one or more ceramic and/or ceramic precursor materials. The batch mixture 304 is mixed and/or pressurized in a barrel or body 305 of the extruder 302, such as by screws 306, although other extrusion elements such as a ram can be utilized. The honeycomb body 100 is cut from honeycomb extrudate 307 that is shaped as the batch mixture 304 is extruded from the extruder 302 through a honeycomb extrusion die 308.

In the illustrated embodiment, the extruder 302 comprises a flow control mechanism 310 that can adjusted via the output of the imaging system 320. The flow control mechanism 310 in FIG. 3B is shown both generically within the extruder 302 and enlarged in more detail according to one embodiment. The flow control mechanism 310 comprises one or more plates that are movable perpendicular to the extrusion direction of the batch through the extruder, e.g., are movable radially with respect to the central axis of the extruder 302 and/or of the honeycomb extrusion die 308. For example, in the detailed enlarged view of the flow control mechanism 310 shown in FIG. 3B, the flow control mechanism 310 comprises a plurality of plates 312 that are separately radially movable with respect to a ring 313 that is fixed in position with respect to the extruder body 305. For example, the plates 312 can each be secured to a screw element 314 threaded in the ring 313, such that rotation of the screw element 314 causes radial movement of the corresponding plate 312. While twelve of the plates 312 are shown, it is to be appreciated that any number of plates, including just a single plate (e.g., a single ring-shaped plate) can be included that are radially movable with respect to the axis through the extruder 302.

Radially repositioning the plate(s) 312 enables flow to be selectively impeded or promoted at various locations at the inlet side of the extrusion die 308. For example, moving one or more of the plates radially inward may block, hinder, restrict, or otherwise impede flow in the area corresponding to the radially-inwardly moved plates, while moving the plates radially outward may result in an increase in the flow corresponding to the moved plate.

In the embodiment of FIG. 3B, the controller 332 of the imaging system 320 is in signal communication with a controller 315 of the extruder 302, e.g., wired or wireless communication. In some embodiments, the controller 332 and 315 are integrated together, e.g., are the same computing device. The controller 315 is configured to receive an output from the controller 332 regarding the geometric imperfections determined by the controller 332 as described herein. In some embodiments, the controller 315 instructs movement of one or more of the plates 312 corresponding to the output signal received from the imaging system 320. For example, if the identified geometric imperfection is of a type that can be addressed by increasing or decreasing flow to a certain location of the honeycomb extrusion die (e.g., such as broken or "non-knitting" webs that may be able to be corrected by increasing flow in the area of the broken or "non-knit" webs), the controller 315 can instruct radial movement of one or more of the plates 312. For example, movement of the plates 312 can be controlled by an actuator 316, such as a rotational actuator, that interfaces with the screw elements 314 to cause rotation of the screw elements 314, and thereby radial movement of the plates 312. Alternatively, the actuator 316 can be another type of actuator corresponding to the actuation type of the plates 312, such as a linear actuator if the plates 312 are linearly actuated to achieve radial movement.

The controller 315 is not limited to control of the flow control mechanism 310, and can be in communication with other and/or additional components of the extruder 302. For example, again referring to FIG. 3B, the controller 315 is in communication with an injector 318. For example, the injector 318 can be configured to inject one or more liquid additions into the barrel 305 in order to change one or more rheology characteristics of the batch mixture 304 during extrusion, such as viscosity. For example, in one embodiment the injector 318 is configured to inject water or other liquid vehicle into the barrel 305. In another embodiment, the injector 318 is configured to inject oil or other extrusion aid.

In accordance with the embodiments described with respect to FIG. 3B, the determination of the imaging system 320 with respect to one or more honeycomb bodies 100 can be used to, e.g., automatically and/or in real-time, adjust the operation of the extruder 302 in order to reduce and/or eliminate geometric imperfections in subsequently extruded honeycomb bodies.

Figure 4:
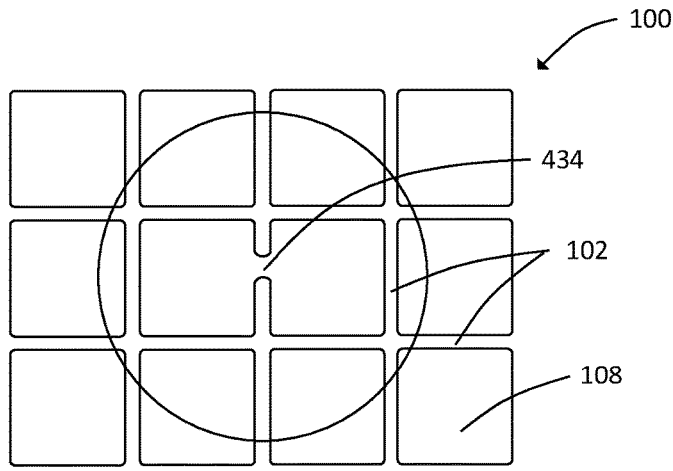
FIGS. 4-6 are end views of portions of a honeycomb body according to one embodiment disclosed herein.
Figure 5:
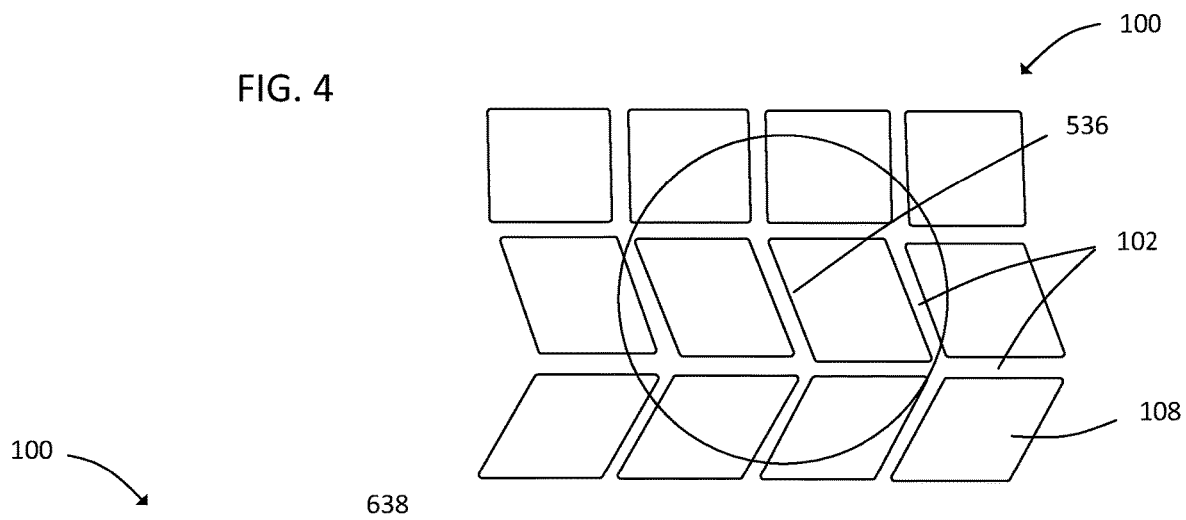
Figure 6:
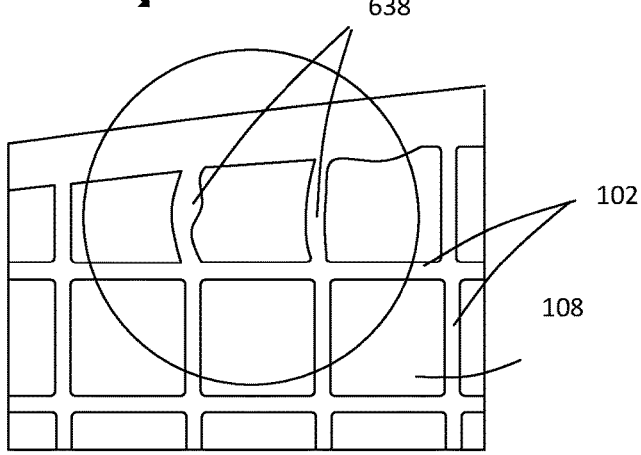

Referring to FIGS. 4-6, geometric imperfections can be identified based on images captured using the imaging system 320. For example, as shown in FIG. 4, one geometric imperfection can be a broken cell wall 434, or missing web, included in a portion of the honeycomb body 100. The broken cell wall 434 generally forms a discontinuity (e.g., break, crack, or gap) in a wall 102 of a channel 108 formed in honeycomb body 100. The discontinuity may extend along the wall 102 over any portion of the longitudinal length of the honeycomb body 100 including over then entire longitudinal length. Another imperfection that may be present in the honeycomb body 100 is a "Z-cell" 536, shown in FIG. 5. That is, a Z-cell is characterized by walls 102 of the honeycomb body that are angled relative to an intended orientation. As an example, the angled walls 102 can alter a cross-sectional shape of an adjacent channel 108, such as by forming a rhombus-shaped channel instead of an intended square shape. There may be a plurality of Z-cells 536 adjacent each other to form a portion of the honeycomb body 100 having channels 108 misshapen, such as by being angled, in comparison to the design. In a still further example, shown in FIG. 6, the honeycomb body 100 can include geometric imperfections in the form of a "C-cell" 638, which are characterized by walls 102 that are bent or bowed.

The geometric imperfections can be determined based on a variety of measured dimensional attributes or parameters, e.g., by a variance between the measured attributes and a set or range of intended values for each attribute. For example, dimensional attributes measured from the high-resolution image can include cell wall angle, horizontal and vertical cell pitch, horizontal and vertical wall thickness, and horizontal and vertical wall bow, shear angles, web distortion, cell area, cell aspect ratio, perimeter length, etc. U.S. Pat. No. 9,996,766 to Richard et al., U.S. Pat. No. 8,285,027 to Zoeller, III, and PCT Publication No. WO2016/187180 to Madara each describes systems, e.g., machine vision systems, and methods that can be utilized, e.g., by the controller 332, to analyze images of the end faces of honeycomb bodies in order to identify, measure, and/or analyze the geometric attributes or parameters of the cells of the honeycomb body 100 from images of the honeycomb body 100, which patent documents are each hereby incorporated by reference in its respective entirety.

Figure 7:
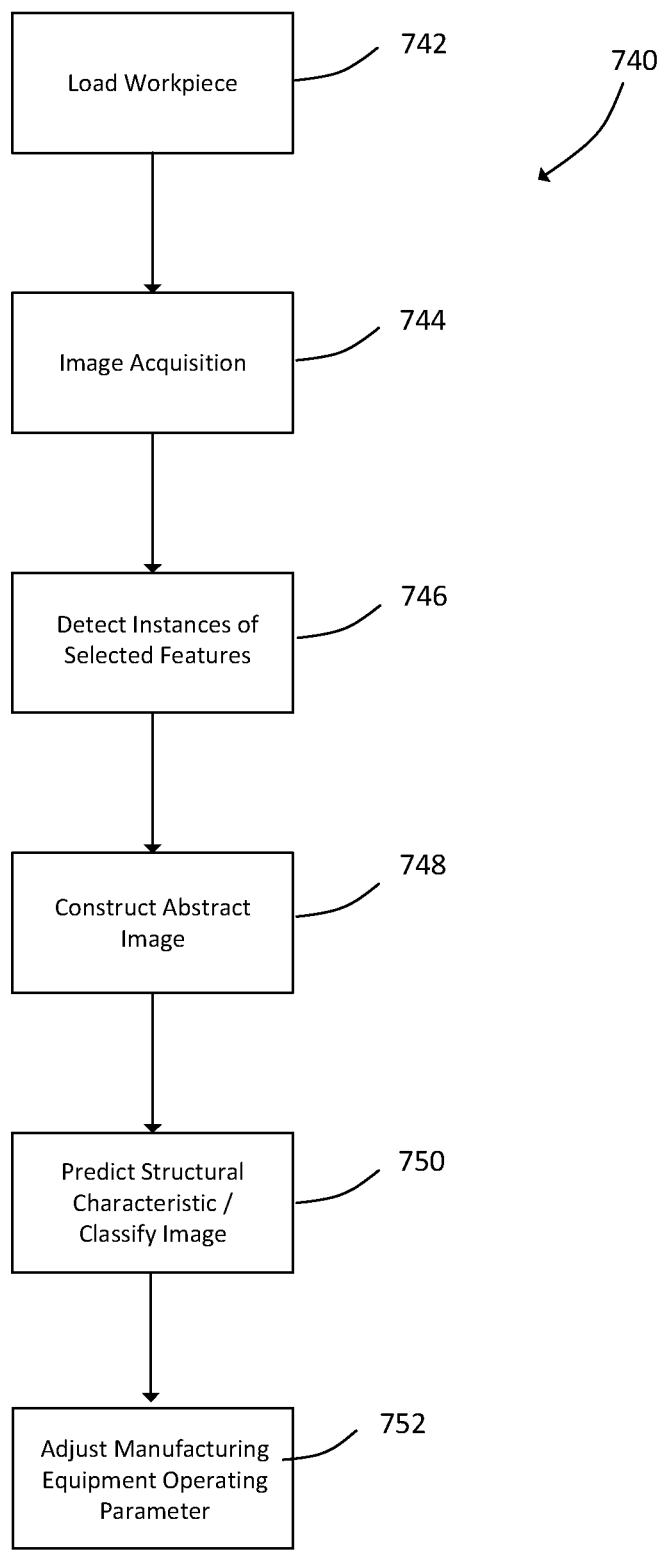
FIG. 7 depicts a flowchart of a method of manufacturing a honeycomb body that comprises predicting a structural characteristic of a honeycomb body and adjusting manufacturing equipment operating parameters in accordance with an embodiment.

FIG. 7 depicts a flowchart 740 for inspecting honeycomb bodies and predicting a performance attribute of the honeycomb bodies. Flowchart 740 can be performed using the imaging system 320 shown in FIG. 4. Further structural and operational embodiments will be apparent to persons skilled in the relevant art(s) based on the discussion regarding the flowchart 740.

As shown in FIG. 7, the method of flowchart 740 begins at step 742. In step 742, a workpiece (e.g., the honeycomb body 100) is loaded into an imaging system (e.g., the imaging system 320). For example, the honeycomb body 100 is loaded onto the part fixture 328 and oriented relative to the lens 324 so that at least a portion of the honeycomb body 100 is disposed in the field of view and depth of field of the camera 322 and lens 324. The part can be loaded before firing (i.e., as a green body), and/or after firing (i.e., as a ceramic body) so that the part can be inspected at different stages through the manufacturing process.

At step 744, an image of the workpiece is collected. The image can be a high-resolution image showing geometric features of the workpiece in fine detail. In an example, the high-resolution image is an image having greater than 10 MP resolution of an end face of the honeycomb body 100, but the high resolution may be even greater, such as 28.8 MP or 86 MP, which may be determined by the resolution of the camera 322 included in the imaging system 320. The image can be a directly illuminated image or a backlit shadow image.

Figure 8:
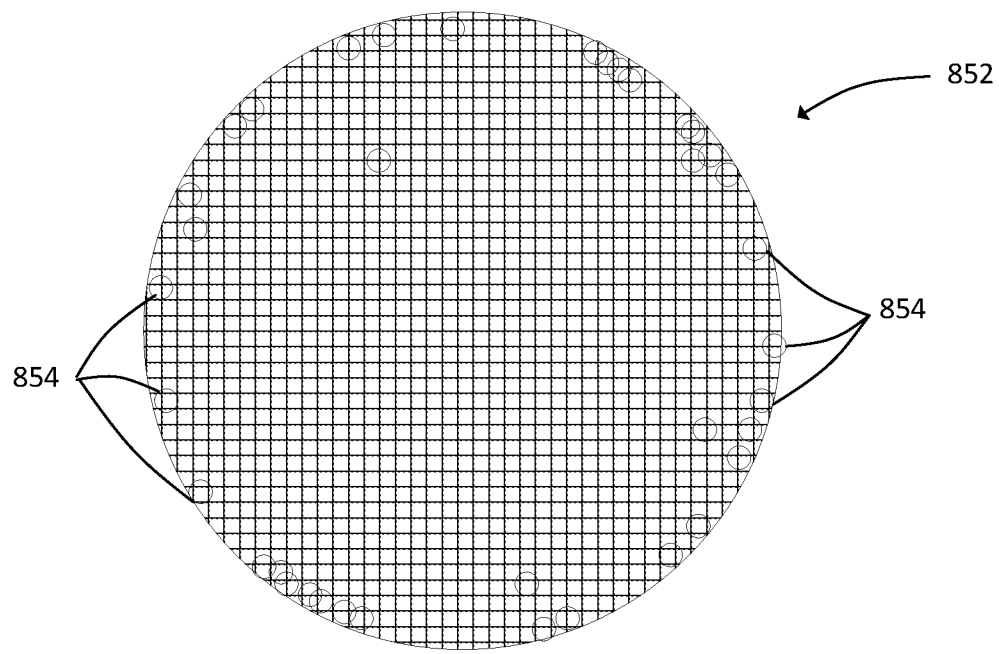
FIG. 8 is a high-resolution image of an end face of a honeycomb body in accordance with an embodiment.

At step 746, instances of features of the honeycomb body are detected by analyzing the high-resolution image. The high-resolution image can be used to identify the type and location of the instances of the features of the honeycomb body 100, such as geometric imperfections in the honeycomb body 100. As shown in FIG. 8, a high-resolution image of honeycomb body 100 includes an image of the channels 108 and outer skin 112 of the honeycomb body 100. In an example, instances of features that provide a correlation to the desired performance attribute (e.g., geometric imperfections) are identified in the high-resolution image, e.g., as indicated by feature markers 854 in FIG. 8. The features marked in the high-resolution image 852 are selected for performing the quantitative analysis of the structural characteristic of the honeycomb body 100. Thus, the "selected" features are those that are determined to be relevant to, and/or that correlate to, the analyzed structural characteristic (e.g., isostatic strength, dimensional accuracy) of the honeycomb body. As discussed in more detail below with respect to FIG. 9, the features identified in the high-resolution image 852 (e.g., as indicated by the features markers 854 in FIG. 9) are later abstracted to enhance the ability of machine learning algorithms to classify the image, and thereby the corresponding honeycomb, with respect to one or more structural characteristics of the honeycomb body.

The dimensional attributes of the honeycomb body 100 can be measured from the high-resolution image 852 using machine vision software executed by one or more processors (e.g., the processor included in controller 332). For example, dimensional attributes measured from the high-resolution image 852 can include cell wall angle, horizontal and vertical cell pitch, horizontal and vertical wall thickness, and horizontal and vertical wall bow, shear angles, web distortion, cell area and aspect ratio, perimeter length, or a combination of these or other dimensions. The one or more processors can be incorporated into the imaging system or they can be separate processors communicating over a network. In an example, a computer vision library, such as OpenCV, can be employed to provide functionality of contour detection and characterization. Examples of systems and methods for measuring the dimensional attributes of a honeycomb body are disclosed in U.S. Pat. No. 9,996,766 to Richard et al., U.S. Pat. No. 8,285,027 to Zoeller, III, and PCT Publication No. WO2016/187180 to Madara, which are incorporated by reference above.

Even though such a high-resolution image is utilized (e.g., a resolution of 10 megapixels or higher), the geometric features that are to be identified and analyzed (e.g., broken cell walls, Z-cells, C-cells, etc.) may only be a few hundred pixels (e.g., less than 1,000 pixels), a few dozen pixels (e.g., less than 100 pixels), or even just a few pixels (e.g., less than 10 pixels) in size. That is, the features may correspond to individual cells, cell walls, or portions of cell walls in an array of hundreds or thousands of cells. Further, each of the cells and cell walls are generally similar in color, shape, size, and/or appearance. In some embodiments, each feature is less than 0.01%, 0.001%, or even 0.0005% of a total resolution of the analyzed image. As a result, the image of this honeycomb body may differ only marginally from an image of "ideal" or "perfect" honeycomb body, even if the honeycomb body has several identified geometric imperfections. Additionally, since the identified features can occur at any given cell, wall, or portion thereof, the entire face of the honeycomb body must be carefully analyzed. Machine learning algorithms such as convolutional neural networks are are not well equipped to accurately or timely perform image classification under these circumstances.

At step 748, an abstracted image 956 is constructed by abstracting the high-resolution image 852. As part of the abstracting, the high-resolution image 956 is augmented with graphical representations of the instances of the geometric features identified in the high-resolution image. In this way, the abstracted image 956 can resemble the original high-resolution image 852, but comprising graphical representations of the selected features (based on measurements taken from the high-resolution image) in place of, or in addition to, the features themselves as originally captured in the high-resolution image 852. For example, the graphical representations can be used to emphasize the features and/or to otherwise facilitate the ability of a machine learning algorithm to perform image classification on the detected instances of the selected features. For example, the graphic representation can have a color, size, shape, orientation, or other visual property that is more readily distinguishable by machine learning than the geometric features of the honeycomb body. In the example shown in FIG. 9, the abstracted image 956 comprises graphical representations 958, 960, 962 of the geometric imperfections (e.g., corresponding to the feature markers 854 indicated in FIG. 8). The graphical representations in abstracted image 956 can comprise, and/or be referred to as, markings or symbols having various visual parameters, such as a shape (e.g., circle, triangle, square, star or any other shape), a color, a pattern, a size, and/or an orientation in a combination that represents each identified instance of the selected features. For example, the visual parameters of the graphical representation may correspond to aspects of the instance of the feature, such as a type (e.g., wall break, Z-cell, C-cell) and/or magnitude (e.g., size of break, angle of Z-cell, dimensions of bowing in C-cell) of a detected instance of a geometric imperfection. The locations of the graphical representations correspond to the locations of the features identified in the high-resolution image 852 (e.g., as indicated by the feature marks 854 in FIG. 8). By using distinct shapes, colors, etc. (as opposed to an essentially monochrome array of repeating cells), a machine learning algorithm can more readily identify and distinguish between different types and/or magnitudes of geometric imperfections throughout the face of each analyzed honeycomb body in order to assist in image classification.

Figure 9:
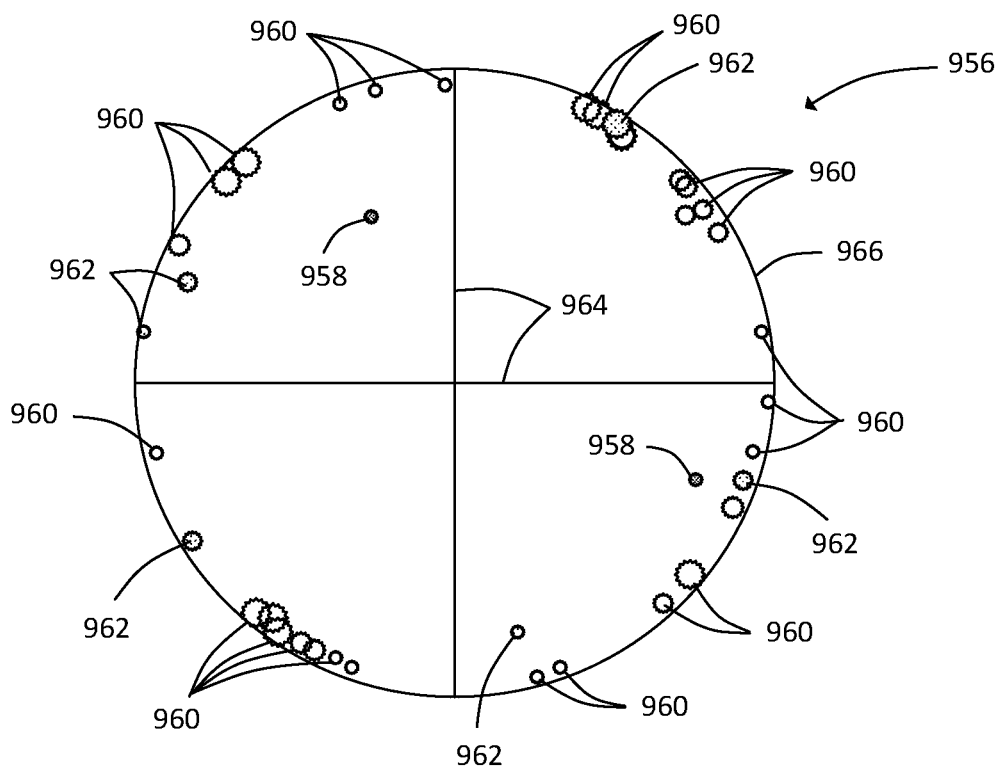
FIG. 9 is an abstracted image generated from the image of FIG. 8 in accordance with an embodiment.

In an embodiment, the abstracted image 956 comprises representations for a plurality of type of geometric imperfections designated by a symbol color, shown by different patterns in FIG. 9, such as representations 958 of broken cell walls 434 in a first color, representations 960 of Z-cells 536 in a second color, and representations 962 of C-cells 638 in a third color. In an example of an abstracted image illustrating C-cells 962 the size of the symbol is larger with a larger curvature and smaller with less curvature. In another example of an abstracted image illustrating C-cells 962, the color of the symbol is more intense or at one end of a color gradient (e.g., a deep red) with a larger curvature and less intense or at an opposite end of the gradient (e.g., light yellow) with less curvature.

Additionally, the use of the graphical representations for the detected features to enhance the detectability of the features of the honeycomb body enables the abstracted image 956 to be generated having a lower resolution than the original high-resolution image 852. That is, not only are the most relevant features made readily identifiable using the above-described graphical representations, but the ability for machine learning algorithms to classify the images is maintained even as the resolution of the image is decreased. Thus, the abstracted image 956 can provide a reduced resolution compared to the high-resolution image 852 and provide a feature map description of the honeycomb body using the graphical representations. Additionally, the abstracted image 956 can be labeled with representations of "baseline" features such as representations of the principal axes 964 and a representation 966 of the outer skin 112 of the honeycomb body 100 so that the features from the images can be geometrically oriented relative to the honeycomb body.

The resolution of the abstracted image 956 can be reduced in comparison to the high-resolution image by including baseline features and select features (e.g., relevant geometric features or imperfections) while reducing or removing image data for portions that do not include the baseline features or select features. As an example, cells that are measured to have attributes within a predefined tolerance of the intended configuration are not represented in the abstracted image 956 and/or can be heavily sub-sampled in the abstracted image 956. As a result, image data for channels 108 that do not include any of the select features, e.g., geometric imperfections, can be ignored and the abstracted image constructed from only, or primarily, the baseline features and the select features. For example, abstracted image 956 comprises representations of the outer skin 966, principal axes 964, broken cell walls 434, and bent/slanted cells (e.g., Z-cells 536 and/or C-cells 638). Additionally, the geometric imperfections can be weighted, or amplified, by applying bias values based on the influence of each feature on the analyzed structural characteristic (e.g., isostatic strength). The influence on the desired structural characteristic may be impacted by the size of the feature, the location of the feature relative to other features, the location of the feature relative to the principal axes 964, and/or the location of the feature relative to the outer skin 966. The weighting of influence of the features can be incorporated into the abstracted image 956 using the size, shape, pattern, and/or color of the symbol.

As described above, the abstracted image 956 can be generated having a resolution that is lower than the high-resolution image 852. In an example, a high-resolution image 852 having a first resolution, e.g., 4,000×4,000, 10,000×10,000, or even 20,000×20,000 pixels, is reduced to a second lower resolution in the abstracted image 956, e.g., a resolution of less than about 1000×1000 pixels, for example 500×500 pixels, or 200×200 pixels, or even 128× 128 pixels. In some embodiments, the resolution of the abstracted image is reduced by at least 75% in comparison to the original high-resolution image. By use of the graphic representation, the selected features are still recognizable even at the reduced resolutions. Additionally, the abstracted images from honeycomb bodies 100 having different sizes and configurations (e.g., different diameters, cells per square inch, etc.) can be scaled, or normalized, to a predefined image size so that the different configurations can be processed using the same machine learning without requiring the machine learning model to be re-trained or re-configured.

The features represented in the abstracted image 956 are not limited to geometric features. For example, the features can comprise or relate to calculated values based on the geometric features, e.g., stress values, that are derived at least in part on information gathered from the high-resolution image 852. In an example, an image processing algorithm is applied to the high-resolution image 852 to generate a simplified skeleton of walls 102 and finite element analysis is performed on the skeleton to estimate the stress value associated with each wall 102. Each channel 108 in the honeycomb body is assigned a representative stress value, e.g., the estimated maximum stress, within its vicinity to form a stress map of the channels 108 throughout the honeycomb body 100 that forms an abstracted image. In an example, the abstracted image can include symbols representing stress values that exceed a predefined threshold, or stress gradients. For example, in one embodiment the abstracted image comprises a heat map having different colors corresponding to different levels of estimated stress.

Figure 10:
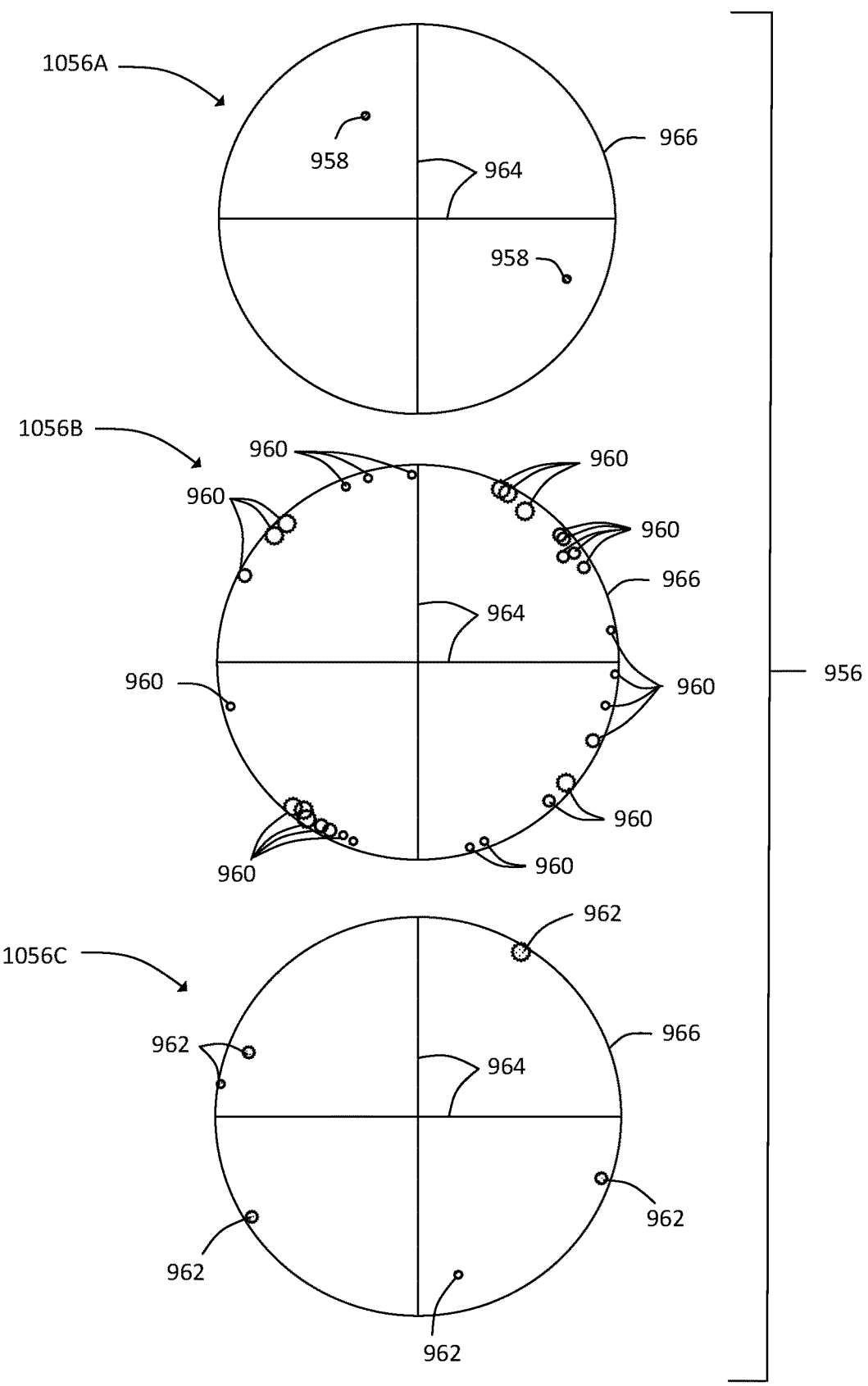
FIG. 10 is an example of the construction of a multichannel abstracted image generated from the image of FIG. 8.

Referring to FIG. 10, the abstracted image 956 can be formed as a multi-channel abstracted image by forming the abstracted image 956 from a plurality of abstracted images 1056A, 1056B, 1056C, with each abstracted image 1056A, 1056B, 1056C representing a different feature, or a different sub-set of features. In an example embodiment, abstracted image 1056A comprises representations 958 of the locations and magnitudes of broken cell walls 434, abstracted image 1056B comprises representations 960 of the locations and magnitudes of Z-cells 536, and abstracted image 1056C comprises representations 962 of the locations and magnitudes of C-cells 638. The features can include any feature included in the workpiece that correlates to variability in the desired structural characteristic. An abstracted image is generated for each feature by creating a cell map from the high-resolution image and normalizing the cell map to the predefined size. The abstracted images are then combined into a multi-channel abstracted image that can be analyzed and classified using machine learning. The abstracted images can be weighted based on the influence of the feature on the desired structural characteristic. In an example, the abstracted images are weighted prior to the combination to provide an ability to fine tune the prediction of the structural characteristic (classification of the images and/or honeycomb bodies) by allowing modification of the influence of each type of feature.

Figure 11:
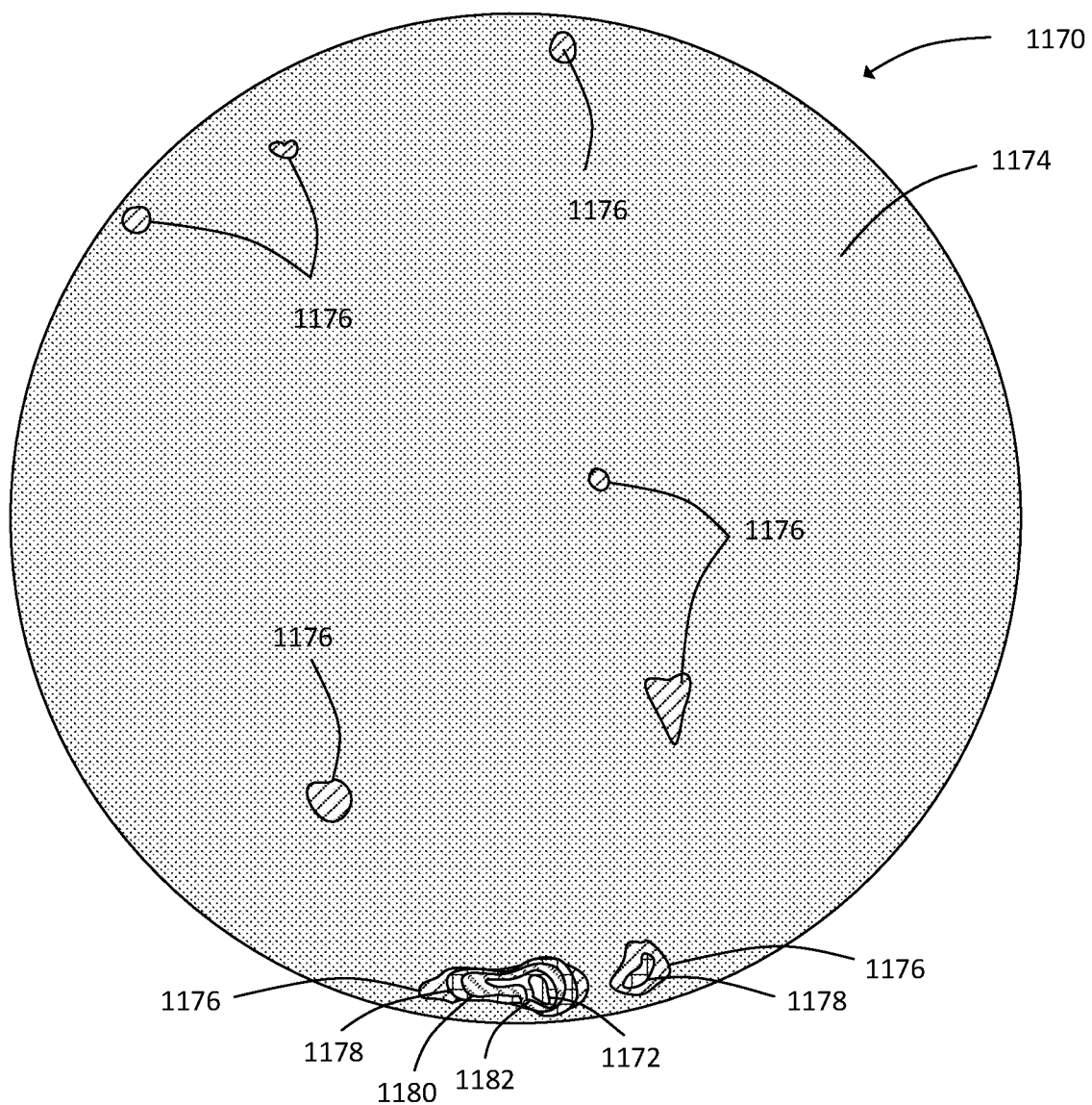
FIG. 11 is an abstracted image generated from the image of FIG. 8 in accordance with an embodiment.

Referring to FIG. 11, as another alternative, an abstracted image can be configured to show a gradient of values of a feature across the workpiece, such as shown in a heat map type image. As an example, an abstracted image 1170 can illustrate the feature values plotted across the image. The abstracted image 1170 comprises regions having different colors, or patterns, that correspond to feature value ranges. In an example embodiment, the regions correspond to stress value ranges that are determined using finite element analysis on a skeleton wall structure generated from the high-resolution image of the honeycomb body 100. For example, the abstracted image 1170 illustrates a high stress region 1172, a low stress region 1174, and a plurality of intermediate stress regions 1176, 1178, 1180, 1182 that combine to illustrate a gradient of stress values across the workpiece. It should be appreciated that a multi-channel abstracted image can be constructed from a plurality of abstracted images including symbolic representations, gradient values, or combinations thereof.

Referring back to FIG. 7, at step 750, the abstracted image 956 is processed using machine learning to predict the structural characteristic of the workpiece, i.e., to probabilistically classify the honeycomb body with respect to the structural characteristic. Typically, the measurement data collected using image measurement software is so voluminous (because of the large number of cells and geometric features included in the honeycomb body 100) that it would overwhelm a system using machine learning. Similarly, machine learning algorithms are not well equipped to perform image classification based on relatively miniscule differences in a high-resolution image (e.g., the features in some embodiments disclosed herein are less than 0.001% of the total size of the image). The lower resolution abstracted image 956 is analyzed and classified using machine learning instead of the high-resolution image 852 to reduce the processing burden. As a result, analyzing an abstracted image 956 significantly reduces the time required to perform the analysis, and the memory storage size and processing power required of the system. In step 750, a machine learning task is performed on the abstracted image by executing a machine learning algorithm to classify the image (e.g., into whether the honeycomb body is predicted to "pass" or "fail").

As described with respect to FIG. 3B, the result of the step 750 can be utilized in step 752 to control one or more operating parameters of an extruder made to manufacture the imaged honeycomb body, e.g., to reduce and/or eliminate geometric imperfections in subsequently extruded honeycomb bodies. For example, the output of the imaging system in step 750 can be utilized to control an extruder component such as a flow control mechanism (e.g., the flow control mechanism 310). For example, the result of step 750 could be utilized to instruct one or more plates of a flow control device to move radially with respect to an axis of the extruder. As another example, the result of the step 750 could be utilized to instruction injection of a liquid addition, such as water or other liquid carrier, and/or oil or other extrusion aid, to adjust rheological characteristics of the batch mixture during extrusion.

The machine learning algorithm can employ deep learning to assist in image classification. In example embodiments the method can employ deep neural networks, such as convolutional neural networks to analyze and classify the abstracted image 956. Neural networks that can be utilized include ResNet50, among others. The prediction model can be developed using a deep learning software package, such as Keras or TensorFlow, which are readily available open-source packages, or another desired software package.

Figure 12:
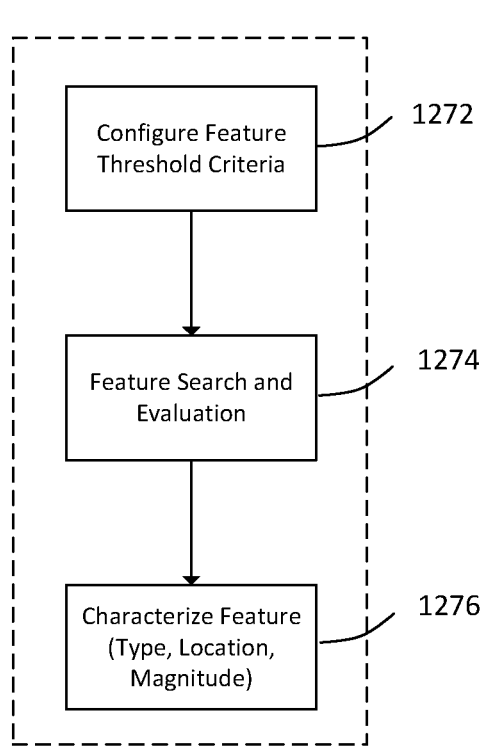
FIGS. 12 and 13 depict flowcharts of methods of predicting a structural characteristic of a honeycomb body in accordance with an embodiment.

FIG. 12 depicts a flowchart 1270 of performing feature detection of a honeycomb body 100, such as in step 746 of flowchart 740. As shown in FIG. 12, the method of flowchart 1270 begins at step 1272 in which feature threshold criteria are configured. The threshold criteria for a selected feature of the honeycomb body 100 can be used to determine which of a plurality of instances of the feature are included in an abstracted image (e.g., abstracted image 956, 1170). The threshold criteria can be based at least in part on a type, magnitude, location, and/or severity of a feature. As an example, the feature can be of the "C-cell" type, e.g., C-cells 638, and the threshold criteria can be based at least in part on a magnitude of a bow or curvature measurement of the associated wall.

At step 1274, a search for the feature is performed and measurements of the feature are evaluated. As an example, a computer vision library, such as OpenCV, can be employed to search for the feature throughout a high-resolution image (e.g., high-resolution image 852).

At step 1276, the features identified during step 1274 are characterized. The features can be characterized by the type, the magnitude, and/or the location of the feature. That characterization can be used to designate a symbol (e.g., shape, color, pattern and/or size) or gradient level to include when constructing an abstracted image (e.g., 956, 1170) illustrating that feature.

Figure 13:
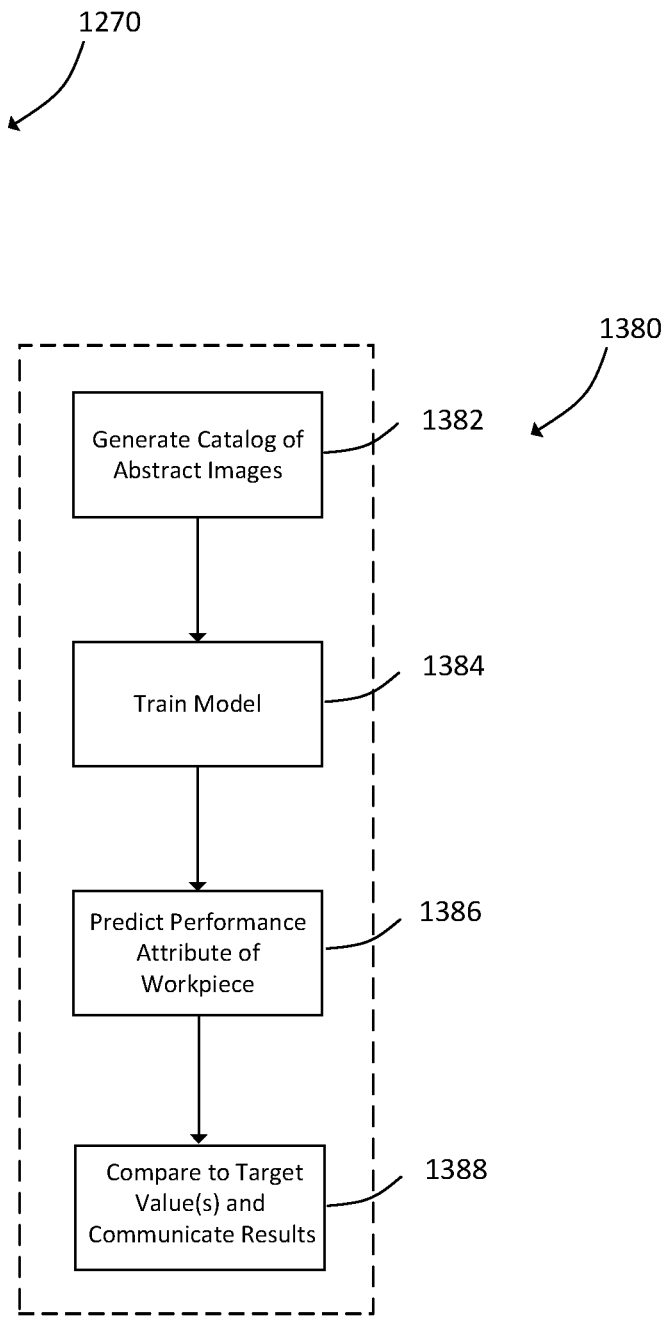

FIG. 13 depicts a flowchart 1380 of performing prediction of a structural characteristic of a honeycomb body 100 by classifying the image, such as in step 750 of flowchart 740. At step 1382, a catalog of abstracted images is generated. For example, a database of abstracted images corresponding to honeycomb bodies that have undergone destructive testing is constructed. In some embodiments, a plurality of high-resolution images may be captured for each honeycomb body, such as by imaging the honeycomb body using different relative positions between the imaging system and the honeycomb body and/or using different field of view aspect ratios. Each of the plurality of high-resolution images may be abstracted individually to create a plurality of abstracted images corresponding to a single honeycomb body and its corresponding set of empirical data. As a result of the different relative positions between the imaging system and the honeycomb body, the plurality of abstracted images can differ for a single honeycomb body, effectively creating a plurality of training samples for the database. Additional methods can be used to supplement the data included in the database, such as bubbling, shifting, resizing, rotating, flipping, adding noise, applying transformations.

At step 1384, the machine learning model is trained. The database of abstracted images is analyzed using the machine learning model and compared to the empirical data to classify the image. In some embodiments, a cost function demonstrating the correlation between the output of the machine learning model and the empirical data is analyzed and reduced by utilizing any optimization algorithm, such as gradient descent or stochastic gradient descent, until the accuracy of the machine learning model reaches a predefined threshold (e.g., a desired or target accuracy percentage). Generating the catalog of abstracted images of step 1382 and training the machine learning model of step 1384 need only be performed once prior to utilizing the system to predict a structural characteristic of a workpiece. It should also be appreciated, however, that samples may continue to be added to the database and the machine learning model trained to continue to improve the model. For example, the isostatic strength of the analyzed honeycomb bodies can be physically tested, e.g., by exerting a radial pressure on the walls of the honeycomb body, to confirm whether or not the isostatic strength prediction was accurate (i.e. to confirm whether the honeycomb body passes or fails an isostatic strength test).

At step 1386, the structural characteristic, e.g., isostatic strength, of the honeycomb body is predicted by classifying the image. For example, an abstracted image for a honeycomb body (e.g., honeycomb body 100) that will not be subjected destructive testing is analyzed using the machine learning model, and the structural characteristic, e.g., isostatic strength, is predicted. At step 1388, the method can additionally comprise communicating a result of the inspection. For example, the value of the structural characteristic can be compared to one or more target thresholds (e.g., an acceptable value or range of acceptable values) to determine whether the honeycomb body has "passed" (e.g., meets the target threshold range or value) or "failed" inspection (e.g., does not meet the target threshold range or value). For example, the structural characteristic can relate to isostatic strength, the target threshold value can be an isostatic strength value (e.g., corresponding to a maximum pressure that the honeycomb body is expected to experience during end-use), and the predicted value can be compared to the target threshold value to probabilistically determine whether or not the honeycomb body being inspected is likely to have a sufficient isostatic strength defined by the target threshold value. The results of the comparison can be communicated visually, e.g., via a display, screen, or monitor of, or in communication with, the controller 332. As another example, the honeycomb bodies determined to have "passed" can be placed on a first conveyor and/or in a first area that directs the passing honeycomb bodies to subsequent manufacturing steps or indicates that those honeycomb bodies have passed. "Failing" honeycomb bodies can be placed on a second conveyor and/or in a second area that results in the destruction of those honeycomb bodies, subjects that honeycomb bodies to additional testing, etc. For example, in one embodiment, each of the honeycomb bodies predicted as "failing" with respect to a structural characteristic (e.g., predicted as having an isostatic strength that is less than a target or threshold minimum isostatic strength) is tested (e.g., destructively or non-destructively) to verify whether each honeycomb body actually does fail with respect to the structural characteristic (e.g., is subjected to radially compressive pressure to test the isostatic strength).

The results of the testing can be compared to the predications to update and improve accuracy of future predictions by the machine learning model.

Figure 14:
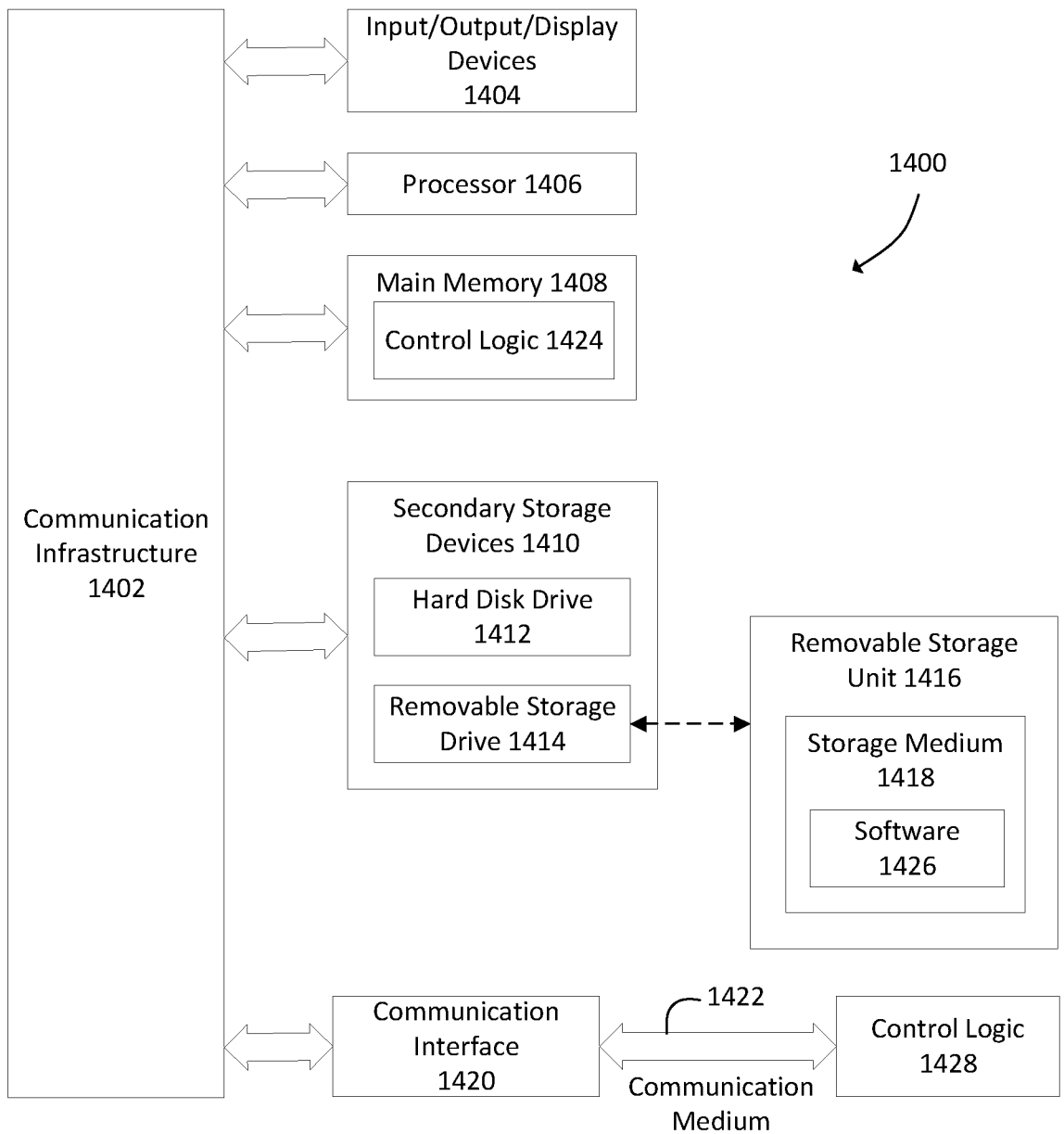
FIG. 14 is a block diagram of a computing system that can be used to implement various embodiments.

Embodiments, systems, components, subcomponents, devices, methods, flowcharts, steps, and/or the like described herein, including but not limited imaging system 320 of FIG. 3, the controller 332, and/or flowcharts 740, 1270, and 1380 of FIGS. 7, 12, and 13, respectively, can be implemented in hardware (e.g., hardware logic/electrical circuitry), or any combination of hardware with software (computer program code configured to be executed in one or more processors or processing devices) and/or firmware. The embodiments described herein, including systems, methods/processes, and/or apparatuses, can be implemented using well known computing devices, such as computer 1400 shown in FIG. 14. For example, each of the steps of flowcharts 740, 1270, and 1380 can be implemented using one or more computers 1400.

Computer 1400 can be any commercially available and well-known communication device, processing device, and/or computer capable of performing the functions described herein. Computer 1400 can be any type of computer, including a server, a desktop computer, a laptop computer, a tablet computer, etc.

Computer 1400 comprises one or more processors (also called central processing units, or CPUs), such as a processor 1406. Processor 1406 is connected to a communication infrastructure 1402, such as a communication bus. In some embodiments, processor 1406 can simultaneously operate multiple computing threads. Computer 1400 also comprises a primary or main memory 1408, such as random access memory (RAM). Main memory 1408 has stored therein control logic 1424 (computer software), and data.

Computer 1400 also comprises one or more secondary storage devices 1410. Secondary storage devices 1410 include, for example, a hard disk drive 1412 and/or a removable storage device or drive 1414, as well as other types of storage devices, such as memory cards and memory sticks. For instance, computer 1400 can include an industry standard interface, such a universal serial bus (USB) interface for interfacing with devices such as a memory stick. Removable storage drive 1414 represents a floppy disk drive, a magnetic tape drive, a compact disk drive, an optical storage device, tape backup, etc.

Removable storage drive 1414 interacts with a removable storage unit 1416. Removable storage unit 1416 comprises a computer useable or readable storage medium 1418 (e.g., non-transitory medium) having stored therein computer software 1426 (control logic) and/or data. Removable storage unit 1416 represents a floppy disk, magnetic tape, compact disk (CD), digital versatile disc (DVD), Blu-ray disc, optical storage disk, memory stick, memory card, or any other computer data storage device. Removable storage drive 1414 reads from and/or writes to removable storage unit 1416 in a well-known manner.

Computer 1400 also comprises input/output/display devices 1404, such as touchscreens, LED and LCD displays, keyboards, pointing devices, etc.

Computer 1400 further comprises a communication or network interface 1420. Communication interface 1420 enables computer 1400 to communicate with remote devices. For example, communication interface 1420 allows computer 1400 to communicate over communication networks or mediums 1422 (representing a form of a computer useable or readable medium), such as local area networks (LANs), wide area networks (WANs), the Internet, etc. Network interface 1420 can interface with remote sites or networks via wired or wireless connections. Examples of communication interface 1420 include but are not limited to a modem (e.g., for 4G and/or 5G communication(s)), a network interface card (e.g., an Ethernet card for Wi-Fi and/or other protocols), a communication port, a Personal Computer Memory Card International Association (PCM-CIA) card, a wired or wireless USB port, etc. Control logic 1428 can be transmitted to and from computer 1400 via the communication medium 1422.

Any apparatus or manufacture comprising a computer useable or readable medium having control logic (software) stored therein is referred to herein as a computer program product or program storage device. Examples of a computer program product include but are not limited to main memory 1408, secondary storage devices 1410 (e.g., hard disk drive 1412), and removable storage unit 1416. Such computer program products, having control logic stored therein that, when executed by one or more data processing devices, cause such data processing devices to operate as described herein, represent embodiments. For example, such computer program products, when executed by processor 1406, can cause processor 1406 to perform any of the steps of flow flowcharts 740, 1270, and 1380 of FIGS. 7, 12, and 13, respectively.

Devices in which embodiments may be implemented can include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CD ROMs, DVD ROMs, etc.), zip disks, tapes, magnetic storage devices, optical storage devices, MEMS-based storage devices, nanotechnology-based storage devices, as well as other media such as flash memory cards, digital video discs, RAM devices, ROM devices, and the like. Such computer-readable storage media can store program modules that include computer program logic to implement, for example, embodiments, systems, components, subcomponents, devices, methods, flowcharts, steps, and/or the like described herein (as noted above), and/or further embodiments described herein. Embodiments are directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

The disclosed technologies can be put into practice using software, firmware, and/or hardware implementations other than those described herein. Any software, firmware, and hardware implementations suitable for performing the functions described herein can be used.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A method of inspecting a honeycomb body, comprising:
capturing a first image;
detecting one or more instances of at least one feature in the first image, the at least one feature correlating to a structural characteristic of the honeycomb body;
abstracting one or more detected instances of the at least one feature identified in the first image by creating a graphical representation of each of the one or more detected instances of the at least one feature;
generating a second image by augmenting the first image with the graphical representation in place of or in addition to each of the one or more detected instances of the at least one feature identified in the first image; and
analyzing the second image using a machine learning algorithm to classify the honeycomb body with respect to the structural characteristic of the honeycomb body.

2. The method of claim 1, wherein the generating the second image further comprises reducing a resolution of the first image such that a first resolution of the first image is greater than a second resolution of the second image.

3. The method of claim 1, wherein the at least one feature relates to at least one of an estimated stress, a web thickness, a broken cell wall, an angled cell wall, or a bent cell wall.

4. The method of claim 1, wherein the abstracting the first image comprises characterizing each of the one or more detected instances of the at least one feature identified in the first image by at least one of a feature type of each of the one or more detected instances, a magnitude quantifying each of the one or more detected instances, or a location on the honeycomb body of each of the one or more detected instances.

5. The method of claim 4, wherein the graphical representation comprises a color, a shape, a size, an orientation, a pattern, or a combination thereof, corresponding to at least one of the feature type, the magnitude, or the location on the honeycomb body.

6. The method of claim 1, wherein the detecting each of the one or more detected instances of the at least one feature in the first image comprises collecting measurement data of the honeycomb body via machine vision software.

7. The method of claim 1, wherein the first image has a resolution of at least about 10 megapixels and each of the one or more detected instances of the at least one feature has a size of at most about 1000 pixels.

8. The method of claim 1, wherein each of the one or more detected instances of the at least one feature has a size of at most about 0.001% of a resolution of the first image.

9. The method of claim 1, wherein the machine learning algorithm is a deep neural network, and the deep neural network is a convolutional neural network.

10. The method of claim 1, wherein the structural characteristic comprises an isostatic strength of the honeycomb body.

11. The method of claim 1, wherein the structural characteristic comprises an accuracy with respect to a target shape of the honeycomb body.

12. The method of claim 1, further comprising determining whether the honeycomb body has passed or failed inspection by comparing a predicted value of the structural characteristic to a target threshold value of the structural characteristic.

13. The method of claim 12, further comprising displaying a result of the determining whether the honeycomb body has passed or failed inspection.

14. The method of claim 12, further comprising moving the honeycomb body to a first area if the determining results in a pass and to a second area if the determining results in a fail.

15. A method of manufacturing a honeycomb body comprising inspecting a honeycomb body according to the method of claim 1 after extruding the honeycomb body from an extruder, the method further comprising controlling operation of one or more components of the extruder in response to the inspecting.

16. The method of claim 15, wherein controlling the operation of one or more components of the extruder comprises moving a plate of a flow control mechanism of the extruder radially with respect to an axis of the extruder, or injecting a liquid addition into the extruder to adjust a rheology of a batch mixture from which the honeycomb body is formed.

17. An imaging system for inspecting a honeycomb body comprising:
a camera configured to capture a first image of an end face of the honeycomb body;
a controller in signal communication with the camera, the controller comprising a machine learning algorithm, the controller configured to:
receive the first image from the camera;
detect one or more instances of at least one feature of the honeycomb body in the first image, wherein the at least one feature correlates to a structural characteristic of the honeycomb body;
abstract the first image by creating a graphical representation of one or more detected instances of the at least one feature;
generate a second image comprising the graphical representation in place of or in addition to the one or more detected instances of the at least one feature; and
analyze the second image using a machine learning algorithm to classify the honeycomb body with respect to the structural characteristic of the honeycomb body.

18. The imaging system of claim 17, wherein the structural characteristic comprises an isostatic strength or an accuracy with respect to a target shape of the honeycomb body.

19. The imaging system of claim 17, wherein the first image has a first resolution and the second image has a second resolution that is lower than the first resolution.

20. The imaging system of claim 17, wherein the controller is configured to create the graphical representation by characterizing the feature by at least one of a feature type of each of the one or more detected instances, a magnitude quantifying each of the one or more detected instances, or a location of each of the one or more detected instances on the honeycomb body.

* * * * *